(12) United States Patent
Bradley et al.

(10) Patent No.: US 12,040,912 B2
(45) Date of Patent: *Jul. 16, 2024

(54) METHOD AND SYSTEM FOR AUGMENTING PRESENTATION OF MEDIA CONTENT USING DEVICES IN AN ENVIRONMENT

(71) Applicant: AT&T Intellectual Property I, L.P., Atlanta, GA (US)

(72) Inventors: Nigel Bradley, Canton, GA (US); Rashmi Palamadai, Naperville, IL (US); Eric Zavesky, Austin, TX (US); Robert Koch, Norcross, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,360

(22) Filed: Nov. 16, 2022

(65) Prior Publication Data

US 2023/0103664 A1    Apr. 6, 2023

Related U.S. Application Data

(63) Continuation of application No. 17/239,794, filed on Apr. 26, 2021, now Pat. No. 11,533,192.

(51) Int. Cl.
| | |
|---|---|
| *H04L 12/28* | (2006.01) |
| *H04N 21/41* | (2011.01) |
| *H04N 21/436* | (2011.01) |

(52) U.S. Cl.
CPC ........ *H04L 12/282* (2013.01); *H04L 12/2814* (2013.01); *H04L 12/2829* (2013.01);
(Continued)

(58) Field of Classification Search
None
See application file for complete search history.

(56) References Cited

U.S. PATENT DOCUMENTS 10,587,782 B1 * 3/2020 Barnes ................... H04N 5/04
11,533,192 B2 * 12/2022 Bradley ............. H04L 12/2809
(Continued)

FOREIGN PATENT DOCUMENTS

| | | | | |
|---|---|---|---|---|
| GB | 2586148 A | * | 2/2021 | ............ A63F 13/26 |
| GB | 2586148 A |   | 2/2021 | |

OTHER PUBLICATIONS

Author: Marfil et al. Title: "Integration of Multisensorial Effects in Synchronised Immersive Hybrid TV Scenarios" Publisher: IEEE Relevance: Entire Document (Year: 2022).*

*Primary Examiner* — John A Follansbee
*Assistant Examiner* — Kamal M Hossain
(74) *Attorney, Agent, or Firm* — Guntin & Gust, PLC; Douglas Schnabel

(57) ABSTRACT

Aspects of the subject disclosure may include, for example, obtaining, from a network server device, first information regarding a first device, generating a media control package based on the first information, wherein the media control package relates to primary content to be presented, wherein the primary content is associated with a first timestamp that corresponds to a first event or context in the primary content, and wherein the media control package includes a first instruction for controlling the first device when a playback position of the primary content corresponds to the first timestamp, and causing the media control package to be provided to the network server device to enable augmentation of a presentation of the first event or context via control of the first device, in accordance with the first instruction, when the playback position of the primary content corresponds to the first timestamp. Other embodiments are disclosed.

20 Claims, 14 Drawing Sheets

(52) U.S. Cl.
CPC ..... *H04N 21/4122* (2013.01); *H04N 21/4126* (2013.01); *H04N 21/4131* (2013.01); *H04L 2012/2841* (2013.01); *H04L 2012/2849* (2013.01); *H04L 2012/285* (2013.01)

(56) References Cited

U.S. PATENT DOCUMENTS

| | | |
|---|---|---|
| 2013/0198321 A1 | 8/2013 | Martin et al. |
| 2013/0198786 A1* | 8/2013 | Cook ................. H05B 47/19 725/78 |
| 2014/0282677 A1 | 9/2014 | Mantell et al. |
| 2015/0113563 A1* | 4/2015 | Woods ............... H04N 21/478 725/34 |
| 2015/0319505 A1 | 11/2015 | Patadia et al. |
| 2016/0105707 A1* | 4/2016 | Chen ................ H04N 21/4884 725/25 |
| 2017/0006334 A1* | 1/2017 | Beckett ............ H04N 21/2187 |
| 2017/0257664 A1* | 9/2017 | Tam ................. H04N 21/6332 |
| 2018/0152751 A1* | 5/2018 | Taylor .............. H04N 21/4122 |
| 2018/0336929 A1* | 11/2018 | Filippini ........... H04N 21/4131 |
| 2019/0052475 A1* | 2/2019 | Dorrendorf ......... H04L 12/282 |
| 2019/0069375 A1* | 2/2019 | Baker .............. H04N 21/43635 |
| 2019/0356939 A1* | 11/2019 | Kuo ................ H04N 21/41265 |
| 2021/0373834 A1 | 12/2021 | Goldberg et al. |

\* cited by examiner

600

METHOD AND SYSTEM FOR AUGMENTING PRESENTATION OF MEDIA CONTENT USING DEVICES IN AN ENVIRONMENT

CROSS REFERENCE TO RELATED APPLICATIONS

This application is a continuation of U.S. patent application Ser. No. 17/239,794 filed on Apr. 26, 2021. All sections of the aforementioned application are incorporated herein by reference in their entirety.

FIELD OF THE DISCLOSURE

The subject disclosure relates to augmenting presentation of media content using devices in an environment.

BACKGROUND

As technology progresses, and the desire for convenient device control and connectivity continues to rise, the use of smart, Internet-of-Things (IoT) devices, such as intelligent lights, intelligent heating, ventilation, air conditioning (HVAC) systems, and other intelligent appliances, is becoming more widespread, especially in home environments. User consumption of digital media content is also increasing at a rapid pace as personal digital devices, such as smartphones, displays, and other entertainment devices, become more ubiquitous in society.

BRIEF DESCRIPTION OF THE DRAWINGS

Reference will now be made to the accompanying drawings, which are not necessarily drawn to scale, and wherein.

DETAILED DESCRIPTION

Figure 1:
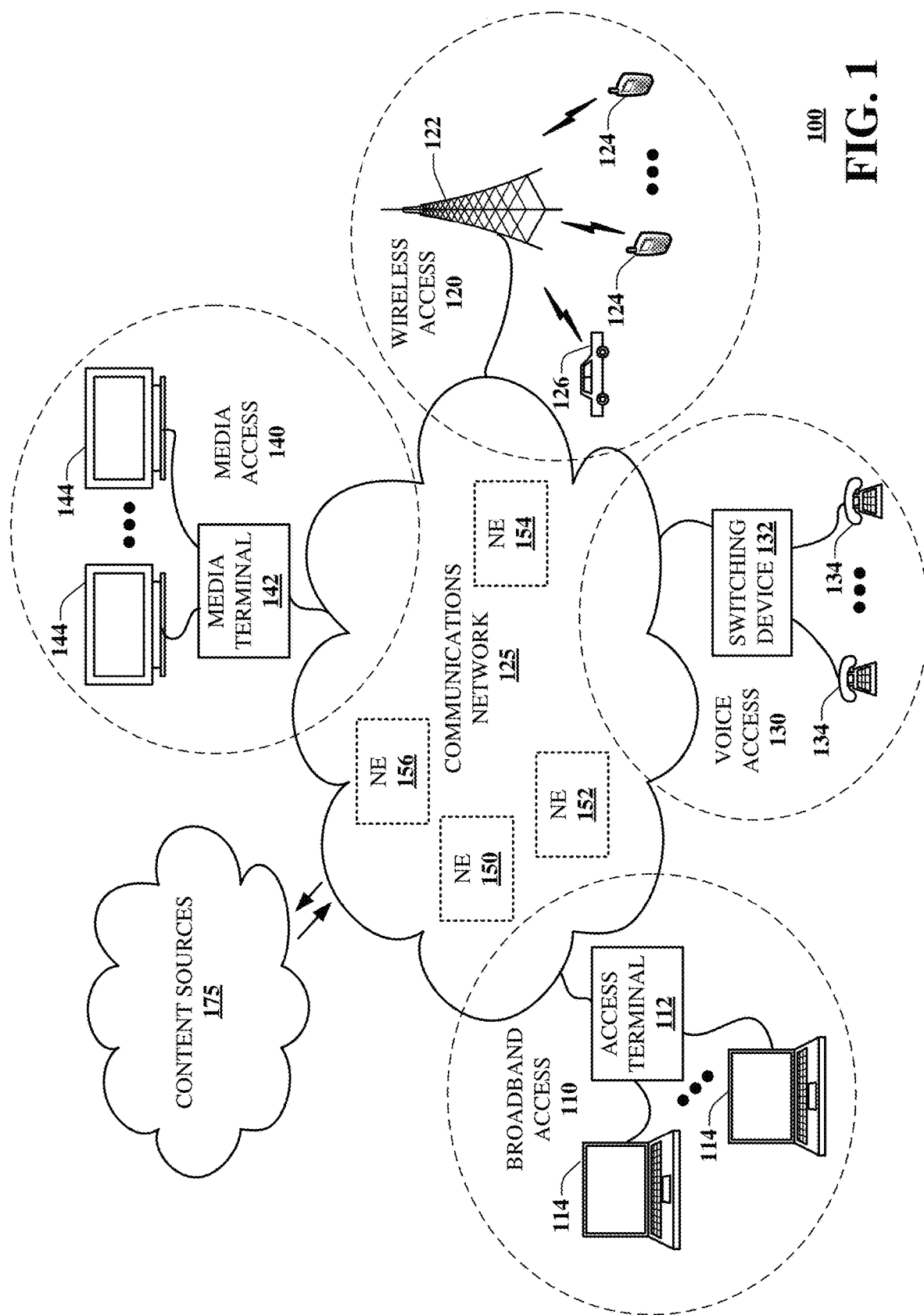
FIG. 1 is a block diagram illustrating an exemplary, non-limiting embodiment of a communications network in accordance with various aspects described herein.

Exemplary embodiments described herein provide an interactive media service platform that is capable of leveraging devices in an environment to augment presentation of media content. Media content may include video content, audio content, gaming content, Internet-related content (e.g., web browsing-related content), immersive (e.g., extended reality (XR), such as augmented reality (AR), virtual reality (VR), or mixed reality (MR)) content, and/or the like. In various embodiments, the interactive media service platform enables control of one or more devices in a user's premises to provide an enhanced immersive experience for the user during presentation of primary content on a primary presentation device (e.g., a primary display device or the like). The one or more devices may include, for example, smart, IoT environment controller(s)/device(s) (e.g., lighting controller(s)/device(s), HVAC controller(s)/device(s), audio output controller(s)/device(s), etc.) and/or secondary display device(s) or mobile user device(s). In some embodiments, the interactive media service platform is capable of generating and providing a media control package that includes instruction(s) usable by a network server device (e.g., a home network server or the like) to control the environment/secondary devices and/or that includes secondary content to be presented by the environment/secondary devices. In certain embodiments, instruction(s) may be aligned, associated, or synchronized with timestamp(s) of primary content that correspond to certain event(s) or context(s) in the primary content (e.g., an explosion in a scene of a movie, a setting or filming location of a scene in a show, etc.), and may be executed to cause one or more of the environment/secondary devices to provide output(s) or effect(s) (e.g., a flashing of a light, an adjustment to a temperature setting, a display of secondary content, etc.) that augment the corresponding event(s) or contexts(s) during presentation of the primary content. In one or more embodiments, secondary content may be similarly aligned, associated, or synchronized with timestamp(s) of primary content that correspond to certain event(s) or context(s) in the primary content, and may be presented by the environment/secondary devices to provide output(s) or effect(s) that augment the corresponding event(s) or contexts(s) during presentation of the primary content.

One or more aspects of the subject disclosure include a device, comprising a processing system including a processor, and a memory that stores executable instructions that, when executed by the processing system, facilitate performance of operations. The operations can include obtaining, over a network from a network server device associated with a user premises, first information regarding a first device. Further, the operations can include generating a media control package based on the obtaining the first information, wherein the media control package relates to primary content to be presented by a primary display device, wherein the primary content is associated with a first timestamp that corresponds to a first event or context in the primary content, and wherein the media control package includes a first instruction for controlling an operation of the first device when a playback position of the primary content corresponds to the first timestamp. Further, the operations can include causing the media control package to be provided to the network server device to enable the network server device to augment a presentation of the first event or context by controlling the operation of the first device, in accordance with the first instruction, when the playback position of the primary content corresponds to the first timestamp.

One or more aspects of the subject disclosure include a non-transitory machine-readable medium, comprising executable instructions that, when executed by a processing system including a processor, facilitate performance of operations. The operations can include receiving, from an interactive media service platform over a network, primary content to be presented by a primary device, and a media control package associated with the primary content, wherein the media control package includes a first instruction that is to be executed to manipulate an operation of a particular device when presenting of the primary content is at a first playback position, and secondary content that is to be presented by a secondary device when presenting of the primary content is at a second playback position. Further, the operations can include, responsive to receiving the primary content, causing the primary device to present the primary content, monitoring a presentation of the primary content on the primary device, and based on determining, from the monitoring, that the presentation of the primary content is at the first playback position, causing the operation of the particular device to be manipulated in accordance with the first instruction. Further, the operations can include, based on determining, from the monitoring, that the presentation of the primary content is at the second playback position, causing the secondary device to present the secondary content.

One or more aspects of the subject disclosure include a method. The method can comprise receiving, by a processing system of a media server including a processor, and from a network server device associated with a user premises, data regarding a secondary device. Further, the method can include deriving, by the processing system, a media control package based on the receiving the data regarding the secondary device, wherein the media control package relates to primary content to be presented by a primary device, wherein the primary content is associated with a first timestamp that corresponds to a first event or context in the primary content, and wherein the media control package includes secondary content to be presented by the secondary device when a playback position of the primary content corresponds to the first timestamp. Further, the method can include transmitting, by the processing system, the media control package to the network server device, wherein the media control package enables the network server device to cause the secondary device to present the secondary content when the playback position of the primary content corresponds to the first timestamp to thereby augment a presentation of the primary content.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, leveraging of devices in an environment to augment presentation of media content. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
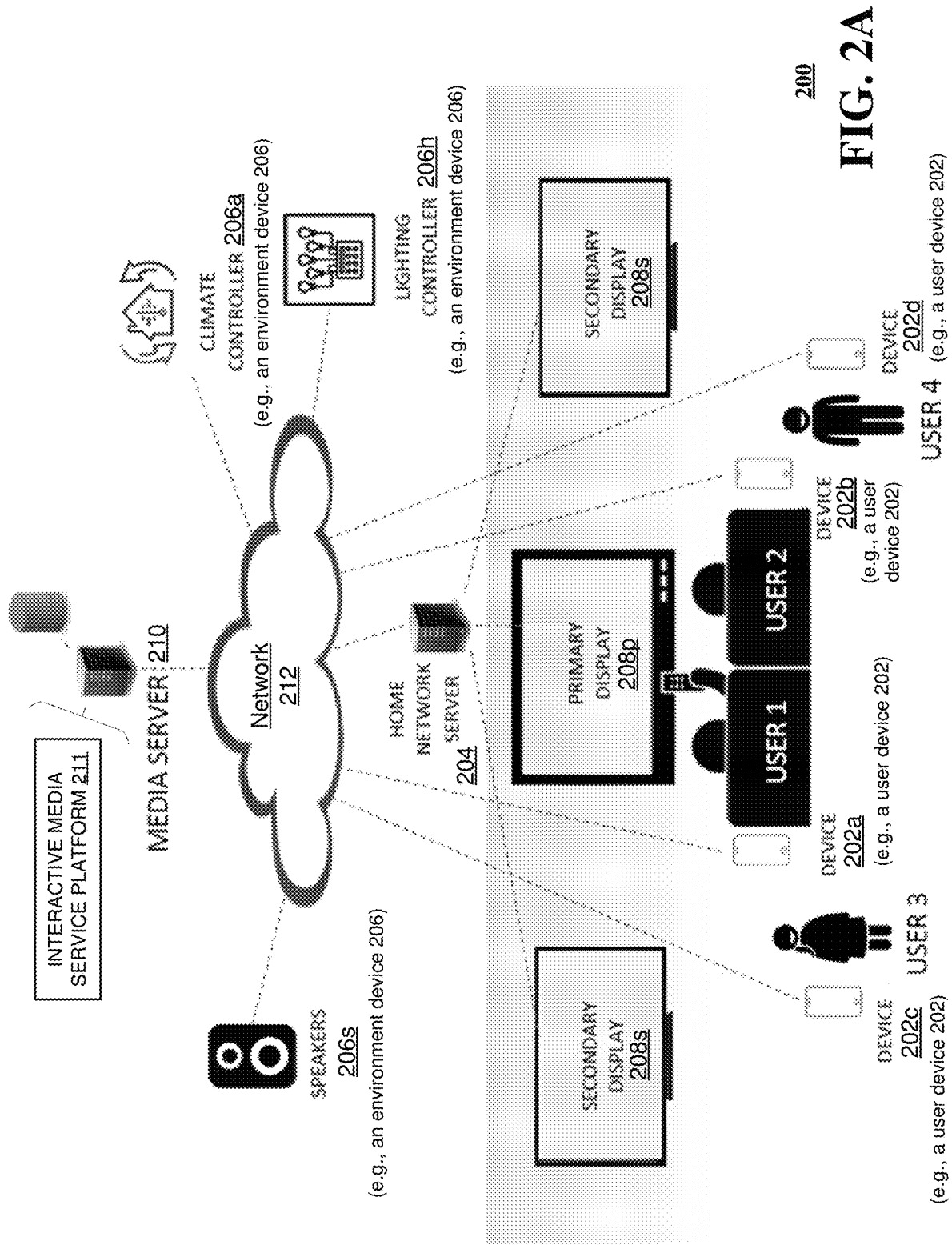
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 functioning within, or overlaid upon, the communications network 100 of FIG. 1 in accordance with various aspects described herein.

As shown in FIG. 2A, the system 200 may include one or more user devices 202 associated with one or more users (e.g., shown as a user device 202*a* associated with a user 1, a user device 202*b* associated with a user 2, a user device 202*c* associated with a user 3, and a user device 202*d* associated with a user 4). A user device 202 can include a communication and/or computing device, such as a mobile phone (e.g., a smart phone, a radiotelephone, etc.), a desktop computer, a laptop computer, a tablet computer, a handheld computer, a pair of smart eyeglasses, a display device, a similar type of device, or a combination of some or all of these devices.

As depicted in FIG. 2A, the system 200 may include a network server device 204 (e.g., a home network server or residential gateway located at a premises), a primary display device 208*p*, and one or more secondary display devices 208*s*. As shown, the system 200 may also include various environment controllers/devices 206 (e.g., smart IoT devices or the like), such as one or more climate controllers 206*a* (e.g., configured to control HVAC devices or the like in one or more zones or regions in the premises, near the premises, and/or outside of the premises), one or more lighting controllers 206*h* (e.g., configured to control one or more lighting devices, such as lamps or the like, in one or more zones or regions in the premises, near the premises, and/or outside of the premises), and/or one or more other output devices (including, e.g., audio output devices 206*s*, such as speakers or the like, which may be associated with the primary display device 208*p* and/or the secondary display device(s) 208*s*). Although not shown, the environment controllers/devices 206 may include a variety of other controllers/devices configured to control other units or structures in a premises. Examples of such other controllers/devices include kitchen or bath appliance controller(s) (e.g., for a stove, a dehumidifier, etc.), drapery (e.g., curtains, shades, blinds, or the like) controller(s), electrical switch controller(s), communication device (e.g., phone, router, modem, etc.) controller(s), door/lock controller(s) (e.g., for room doors, garage doors, etc.), and so on.

In exemplary embodiments, the network server device 204 may be communicatively coupled to the environment controllers/devices 206, the primary display device 208*p*, the secondary display device(s) 208*s*, and/or the user device(s) 202, and may be configured to facilitate control of operations of the environment controllers/devices 206, presentation of primary content on the primary display device 208*p*, and/or presentation of secondary content on the secondary display device(s) 208*s* and/or the user device(s) 202. In various embodiments, the network server device 204 may include, be associated with, or function as, a media player, controller, or renderer, such as a set-top box (STB), a video player, an audio player, a gaming device, an immersive content device (e.g., an XR device), or the like, that controls presentation of content on the primary display device 208*p* and/or the secondary display device(s) 208*s*. In various embodiments, the network server device 204 may be equipped with one or more communication protocols for communicating with, and controlling the operation of, the environment controllers/devices 206.

As shown in FIG. 2A, the system 200 may include a media server 210. In exemplary embodiments, the media server 210 may include an interactive media service platform 211 that is configured to provide an interactive media service for subscribers. The interactive media service platform 211 may be communicatively coupled with respective network server devices (e.g., such as the network server device 204 or the like) associated with, or located in, respective premises of different subscribers, and may facilitate communication and/or delivery of primary content (e.g., media content, such as video/audio content (e.g., Over-The-Top (OTT) media content or the like), gaming content, Internet-related content, immersive (XR) content, and/or the like) and secondary content (e.g., control instructions and/or secondary content in the form of media control package(s) or the like, as described in more detail below) to the network server devices.

The primary display device 208*p* and/or the secondary display device(s) 208*s* may each be an end user device (e.g., devices that are shared amongst users), such as a television or a similar display device. In exemplary embodiments, the primary display device 208*p* may be configured to render and/or present primary content—e.g., media content, such as streaming media content (e.g., OTT media content, such as video that includes ad pods, long form video, episodes of shows, movies, etc.), and/or the like. In some embodiments, a user device 202 (e.g., one or more of the user devices 202*a*-202*d*) may include or function as a primary display device (e.g., primary display device 208*p*). In such embodiments, the system 200 may or may not include a primary display device 208*p* separate from the user device 202. In various embodiments, the secondary display device(s) 208*s* may (e.g., similarly) be configured to render and/or present content—e.g., secondary content, such as secondary, or auxiliary, content associated with streaming media content, and/or the like. In certain embodiments, one or more of the secondary display devices 208*s* may include a structure, such as a window, a wall, etc. that is transformable into, or that can be used as, a display device (e.g., a high-definition window television, a projector screen, or the like).

As shown in FIG. 2A, various of the user devices 202, the network server device 204, the environment controllers/devices 206, the primary display device 208*p*, the secondary display device(s) 208*s*, and the media server 210 may be communicatively coupled to one another over a network 212. The network 212 may include one or more wired and/or wireless networks. For example, the network 212 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

It will be appreciated and understood that the system 200 can include any number/types of users, environment controllers/devices, primary display devices, secondary display devices, user devices, media servers, interactive media service platforms, and networks, and thus the number/types of users, environment controllers/devices, primary display devices, secondary display devices, user devices, media servers, interactive media service platforms, and networks, shown in FIG. 2A are for illustrative purposes only.

FIGS. 2B-2G are block diagrams illustrating example, non-limiting embodiments of functions provided, or facilitated, by the system 200 (e.g., the interactive media service platform 211 and/or the network server device 204), in accordance with various aspects described herein. In exemplary embodiments, the interactive media service platform 211 may provide an interactive media service that facilitates communication and/or delivery of primary content (e.g., streaming media content (e.g., OTT media content, such as video that includes ad pods, long form video, episodes of shows, movies, etc.)) along with accompanying media control package(s) for controlling, or otherwise manipulating, environment/secondary devices (e.g., the environment controllers/devices 206, the secondary display devices 208s, and/or the user devices 202) in concert with presentation of the primary content. In various embodiments, the interactive media service platform 211 may facilitate communication and/or delivery of primary content and media control package(s) to the network server device 204.

The interactive media service platform 211 may be configured to provide primary content and/or media control packages in any suitable manner, such as via broadcast, unicast, multicast, anycast, or the like. In some embodiments, the interactive media service platform 211 may be configured to provide primary content and media control packages in different manners. For instance, the interactive media service platform 211 may provide primary content to all subscribers' premises via broadcast, but to accommodate particular subscribers whose premises are equipped with one or more of the network server device 204, one or more of the environment controller(s)/device(s) 206, one or more of the secondary display device(s) 208s, and/or one or more of the user device(s) 202 (and thus are equipped to provide augmented experiences for the particular subscribers, as described herein), the interactive media service platform 211 may unicast or multicast media control package(s) to the particular subscribers.

In some embodiments, primary content may include metadata that is defined, or otherwise provided, by a creator or provider of the primary content. The metadata may include tags or the like that identify timestamp(s) for various portions (e.g., scenes or the like) of the primary content. In various embodiments, a timestamp may correspond to a particular scene, event, or context in the primary content for which manipulation of an environment controller/device may be performed to provide an immersive media content consumption experience for users.

In exemplary embodiments, a media control package may include one or more instructions that are aligned, associated, or synchronized with corresponding timestamp(s) of the primary content, and that are usable by the network server device 204 to control one or more of the environment controllers/devices 206 during presentation of the primary content. Additionally, or alternatively, in various embodiments, a media control package may include one or more secondary content items that are aligned, associated, or synchronized with corresponding timestamp(s) of the primary content, and that may be presented by one or more of the secondary display devices 208s and/or one or more of the user devices 202 during presentation of the primary content. In one or more embodiments, the interactive media service platform 211 may provide the primary content and the media control package (e.g., substantially) simultaneously, or at different times (e.g., one after another, but where the media control package may be delivered prior to presentation of the primary content on the primary display 208p, such that control instructions and/or secondary content are prepositioned in advance of playback of the primary content).

Figure 2B:
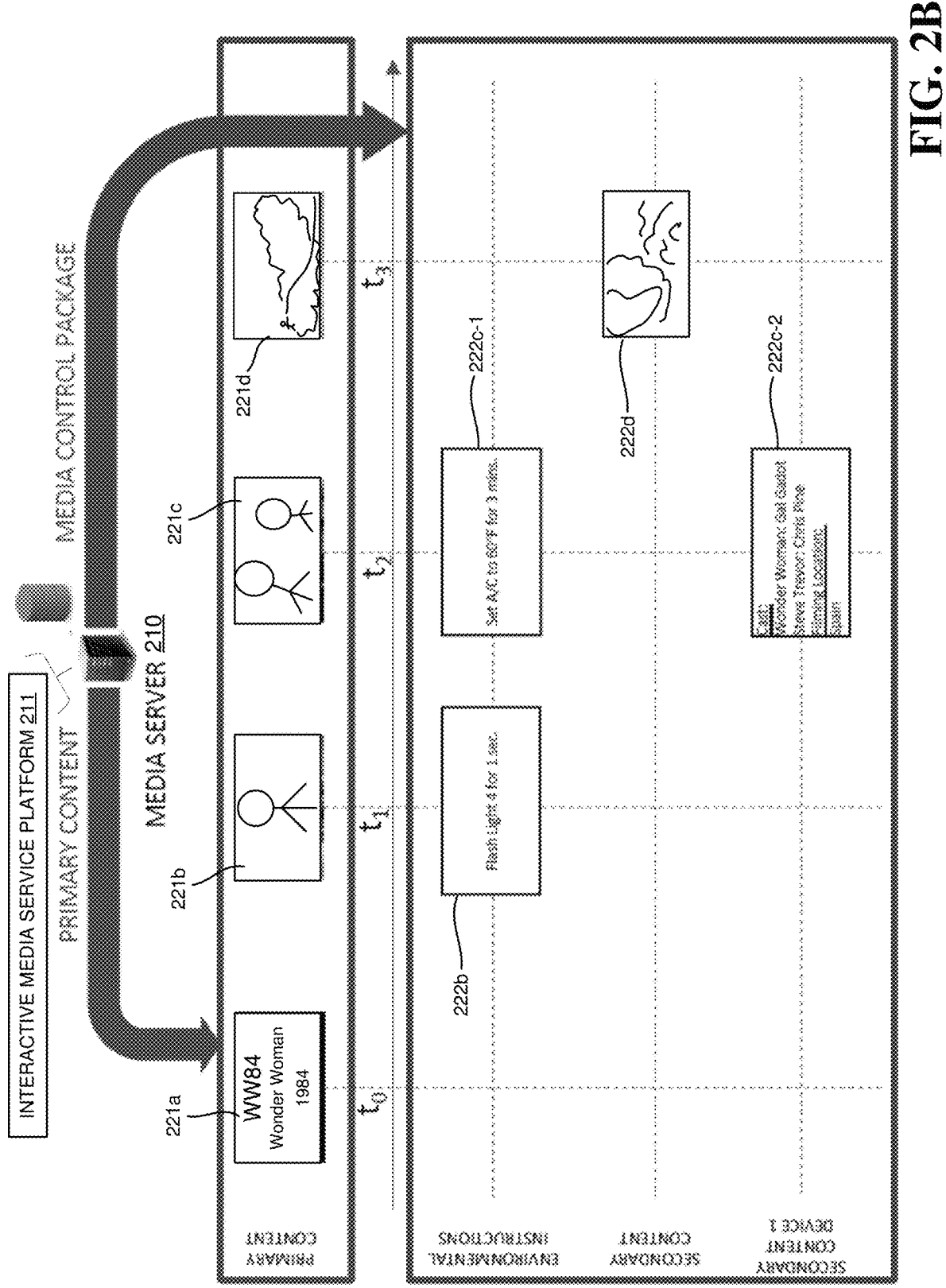
FIGS. 2B-2G are block diagrams illustrating non-limiting, example uses of the system of FIG. 2A, in accordance with various aspects described herein.

In a case where primary content includes video content, such as a movie or the like, metadata associated with the primary content may include one or more timestamps for one or more corresponding scenes or events in the movie. For example, as shown in FIG. 2B, the metadata may include timestamps for one or more particular scenes or events in the film "Wonder Woman 1984" (although only timestamps relating to certain scenes or events of the movie are shown for illustrative purposes). Continuing the example, a timestamp $t_0$ may correspond to a scene or event 221a, a timestamp $t_1$ may correspond to a scene or event 221b, a timestamp $t_2$ may correspond to a scene or event 221c, and a timestamp $t_3$ may correspond to a scene or event 221d. Further continuing the example, a media control package for the movie may include control instructions and/or secondary content that are timed for execution/presentation based on the timestamps.

In various embodiments, a creator or provider of the primary content may determine which scenes or events thereof are to be accompanied by, or are to trigger providing of, auxiliary effects and/or secondary content, and may identify one or more appropriate control instructions and/or secondary content items (e.g., audio, text, video, images, graphics, or the like) to be included in the media control package. This enables the creator or provider to derive an immersive version of the primary content, such as an immersive version of the film "Wonder Woman 1984" that users may opt to consume. In some embodiments, control instructions and/or secondary content may be defined or provided by other users (e.g., users that have previously consumed the primary content and have created customized control instructions and/or secondary content therefor).

As depicted in FIG. 2B, the media control package may include a first instruction 222b aligned, associated, or synchronized with the timestamp $t_1$ for controlling the lighting controller 206h to cause one or more lighting devices to flash (e.g., for one second) so as to augment, or otherwise provide an auxiliary effect to, an explosion scene in the movie. In this case, the network server device 204 may, based upon monitoring a presentation of the movie and determining that the playback position of the movie corresponds to the timestamp $t_1$, control or invoke the lighting controller 206h, in accordance with the first instruction 222b, to cause the one or more lighting devices to flash accordingly (e.g., as shown by reference number 231 in FIG. 2D).

As shown in FIG. 2B, the media control package may include a second instruction 222c-1 aligned, associated, or synchronized with the timestamp $t_2$ for controlling the climate controller 206a to adjust a temperature setting of one or more HVAC devices (e.g., to set an air conditioning unit to 60 degrees Fahrenheit for three minutes) so as to physically augment, or otherwise provide an auxiliary effect to, a scene that was filmed in, or that depicts, a cold environment. In this case, the network server device 204 may, based upon monitoring the presentation of the movie and determining that the playback position of the movie corresponds to the timestamp $t_2$, control or invoke the climate controller 206a to adjust the temperature setting of the one or more HVAC devices accordingly (e.g., as shown by reference number(s) 241 in FIG. 2E).

As depicted in FIG. 2B, the media control package may include secondary content 222c-2 aligned, associated, or synchronized with the timestamp $t_2$ to be presented by one or more user devices (e.g., one or more of the user devices 202). For example, the secondary content 222c-2 may include information regarding a scene or portion of the movie (e.g., data regarding the cast or characters present in the scene, data regarding a filming location of the scene, etc.). In this case, the network server device 204 may, based upon monitoring the presentation of the movie and determining that the playback position of the movie corresponds to the timestamp $t_2$, cause or invoke the one or more user devices to present the secondary content regarding the scene or portion of the movie accordingly (e.g., as shown by reference number 251 in FIG. 2F). Although not shown, in certain embodiments, the secondary content 222c-2 may be additionally, or alternatively, be presented by one or more other devices (e.g., the primary display device 208*p*, the secondary display device(s) 208*s*, and/or the like). In various embodiments, providing such secondary content, during presentation of primary content, may also facilitate social interaction. For example, in a case where multiple users, such as the user 1 and the user 2 are watching the movie "Wonder Woman 1984," the media control package may include different secondary content for the user 1 and the user 2. Continuing the example, the interactive media service platform 211 may (e.g., randomly; based upon user selections submitted by the user 1 via the user device 202*a* and/or the user 2 via the user device 202*b*; based upon user profile information associated with the user 1 and/or user profile information associated with the user 2; etc.) associate a first character in the movie (e.g., the character Wonder Woman) with the user 1 and a second character in the movie (e.g., the character Steve Trevor) with the user 2, and may provide (e.g., to the user device 202*a*) information that is known only by the first character to the user 1, and provide (e.g., to the user device 202*b*) different information that is known only by the second character to the user 2, to thereby promote suspense and/or engagement between the user 1 and the user 2 during presentation of the movie.

As also shown in FIG. 2B, the media control package may include secondary content 222*d* aligned, associated, or synchronized with the timestamp $t_3$ to be presented by one or more secondary display devices (e.g., one or more of the secondary display devices 208*s*). For example, the secondary content 222*d* may include audio, text, video, images, graphics, or the like, such as a video clip that shows additional clouds in the sky that extends or accompanies a primary scene of a portion of the sky. Here, the network server device 204 may, based upon monitoring the presentation of the movie and determining that the playback position of the movie corresponds to the timestamp $t_3$, cause or invoke the one or more secondary display devices to present the secondary content relating to the scene or portion of the movie accordingly (e.g., as shown by reference number(s) 261 in FIG. 2G).

It is to be appreciated and understood that numerous types of secondary content suitable for presentation via different types of secondary display devices may be defined to augment presentation of various primary content. For example, additional zombies may be presented on a secondary display device 208*s* (e.g., such as a window display or television) to augment a scene in a zombie-related movie that is being presented on the primary display device 208*p*, backup dancers may be shown on a secondary display device 208*s* to augment a music show or festival that is being presented on the primary display device 208*p*, and so on.

Figure 2C:
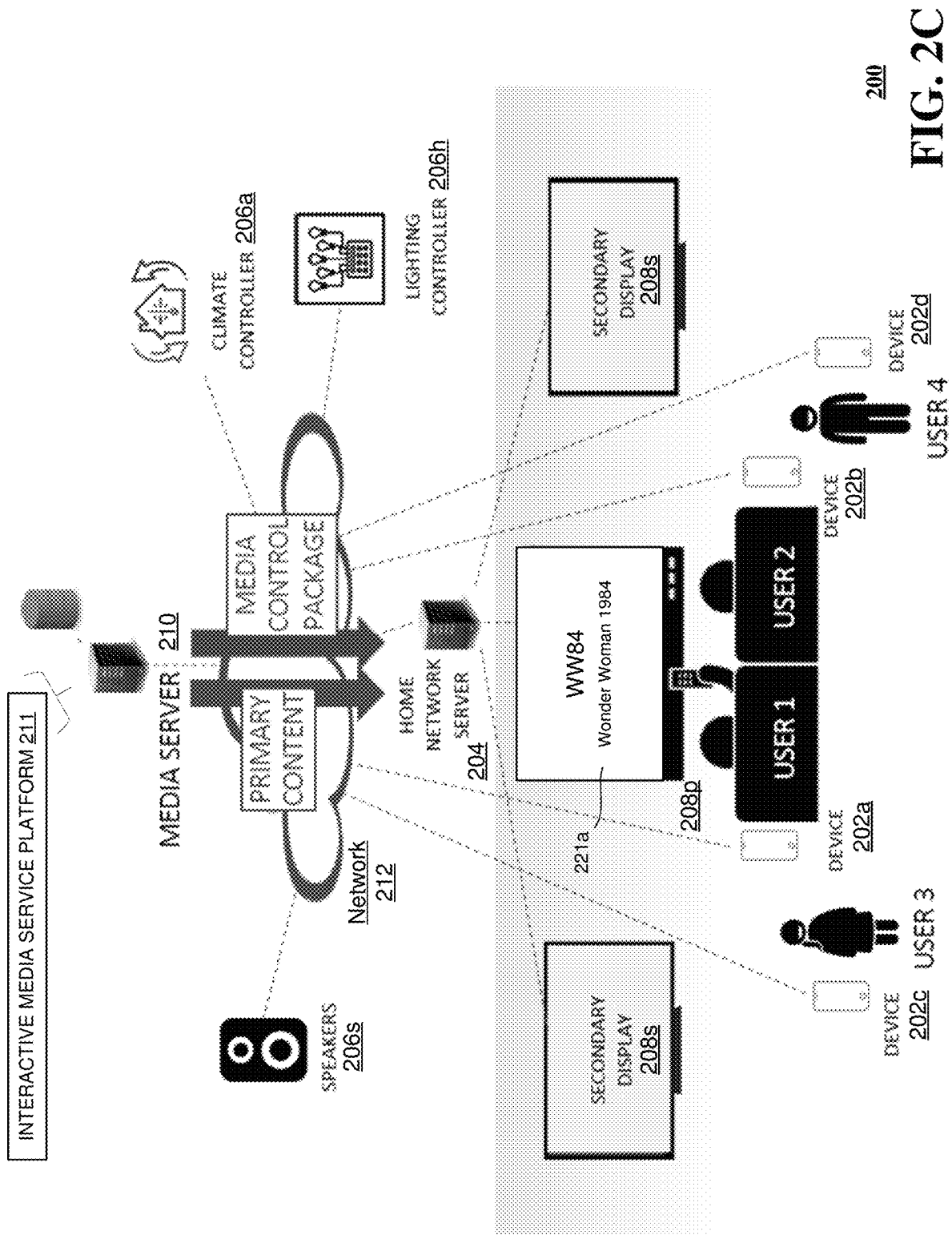
Figure 2D:
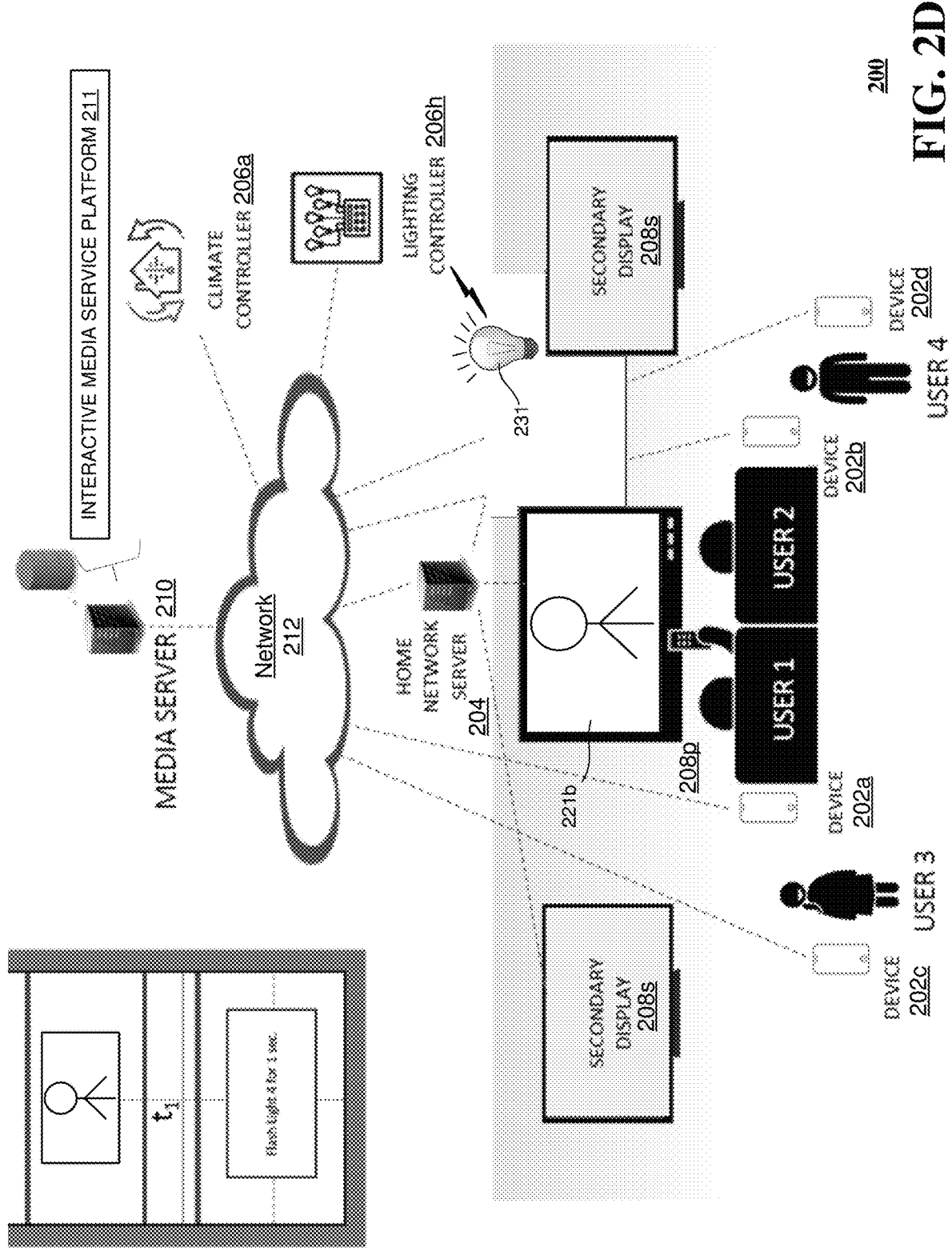
Figure 2E:
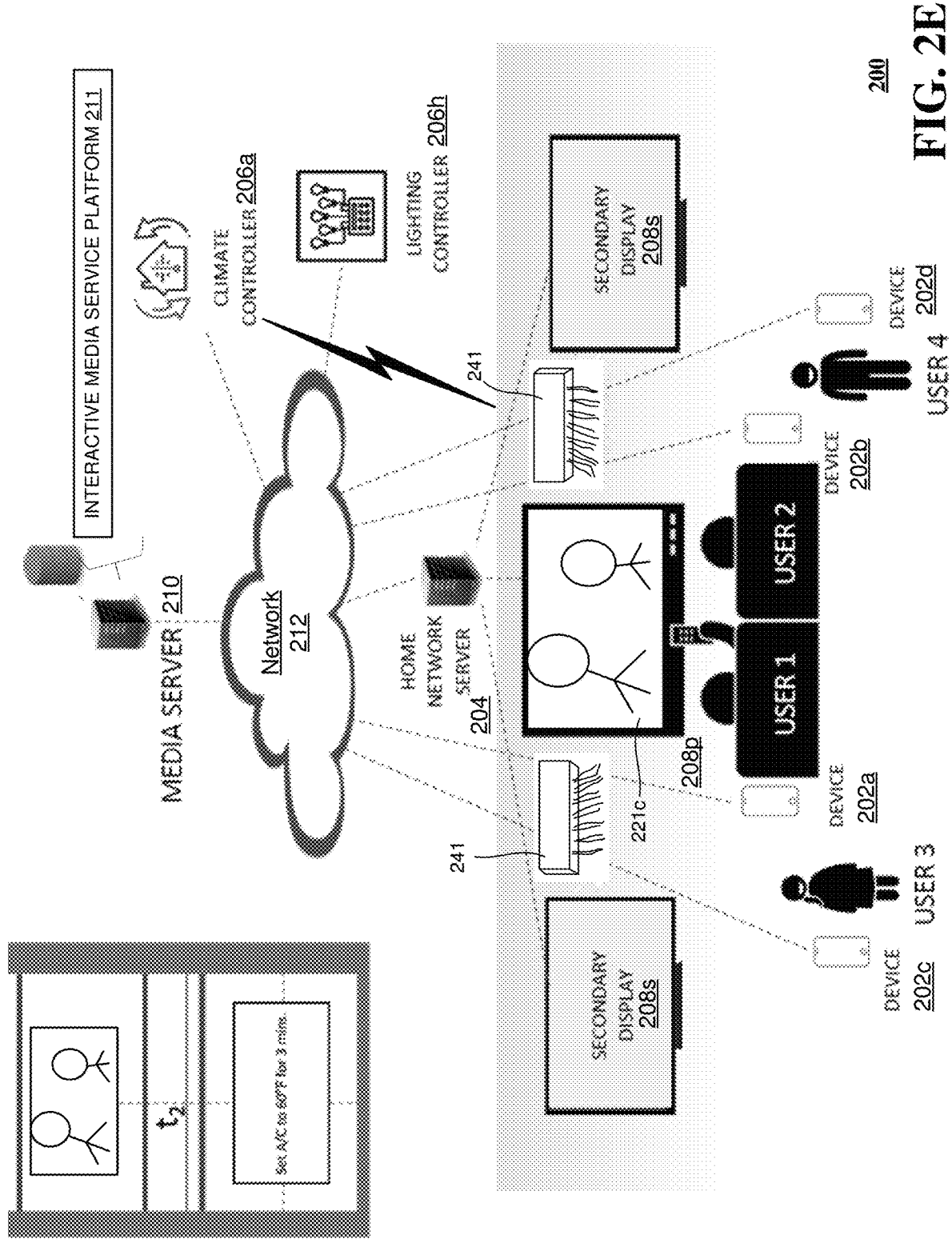
Figure 2F:
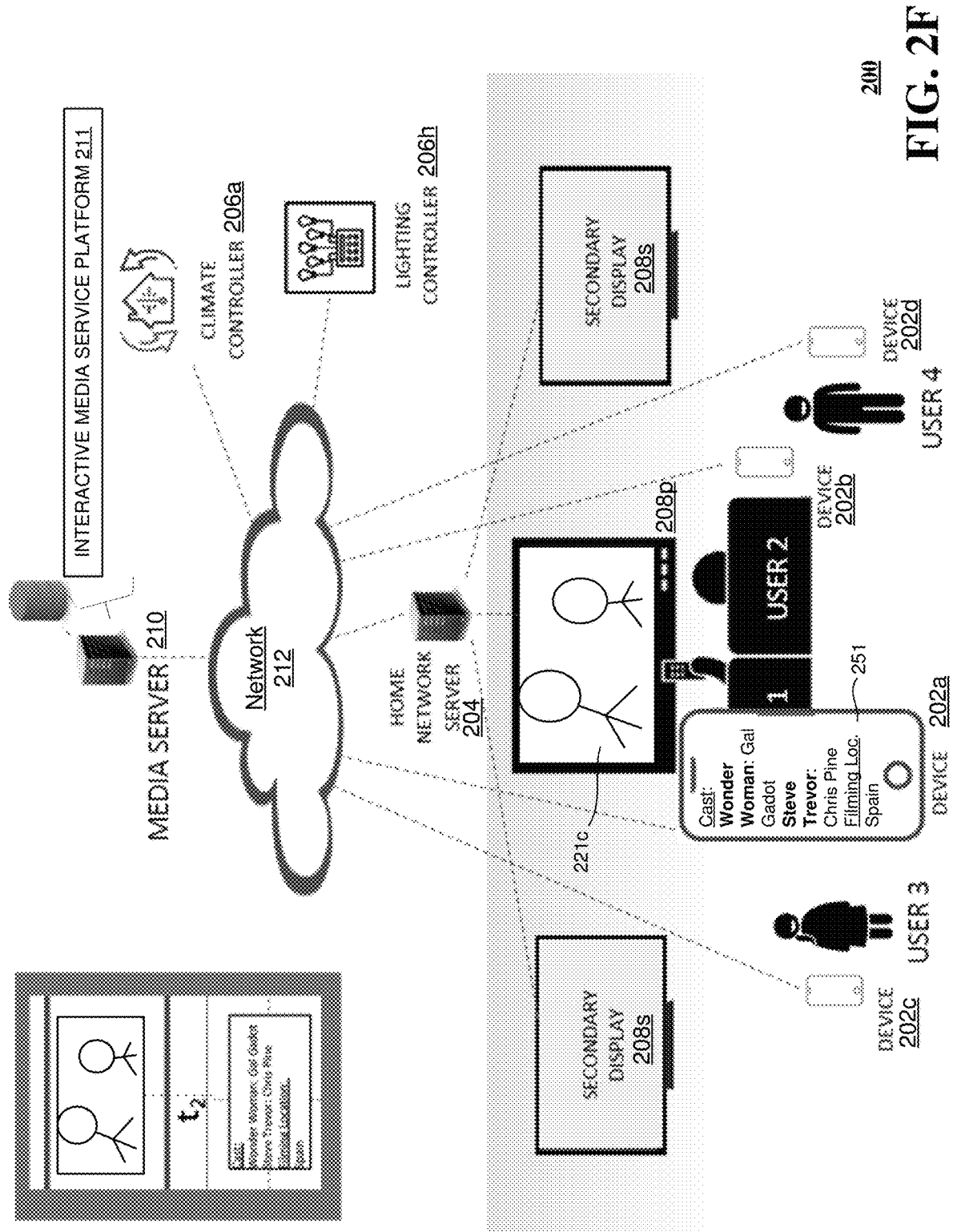
Figure 2G:
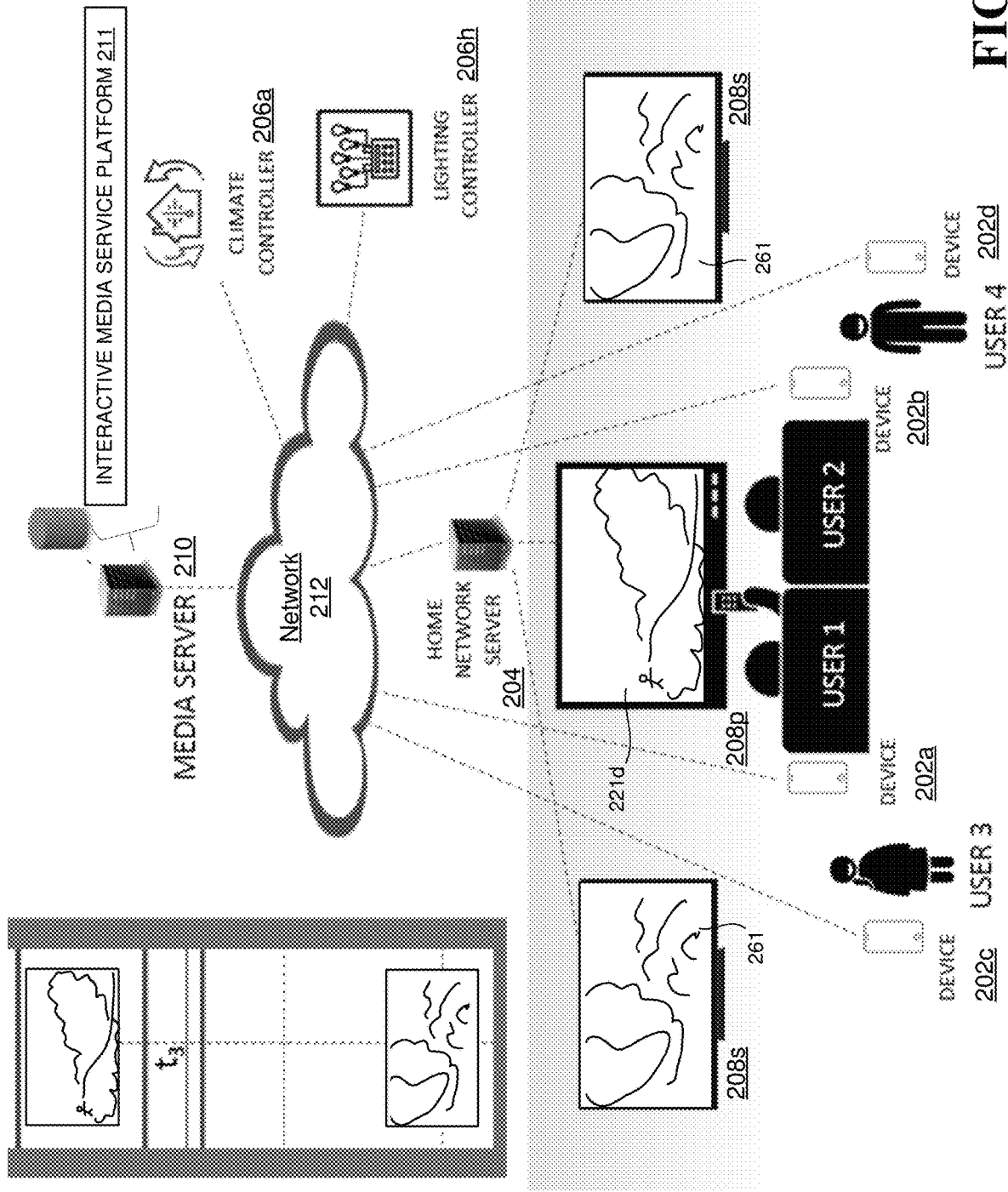

In cases where a scene or an event does not have any corresponding control instructions or secondary content aligned or synchronized therewith (e.g., the scene or portion 221*a* of FIG. 2B), the network server device 204 may not perform any control functions in connection with that scene or event (e.g., other than to cause the primary display device 208*p* to present the scene, such as depicted in FIG. 2C).

In this way, a media control package can, based on timestamps associated with portions of primary content, coordinate or cause auxiliary effects and/or secondary content to be provided or presented by environment devices, user devices, and/or secondary display devices to enrich a user's media consumption experience.

In various embodiments, the network server device 204 may function as an intelligent, centralized controller that interacts with environment controllers/devices (e.g., the environment controllers/devices 206), user devices (e.g., the user devices 202), and/or secondary display devices (e.g., the secondary display devices 208*s*) located in, near, or outside of a premises, and that builds and maintains a premises profile that includes device information regarding such devices. Device information may include, for example, data regarding status, presence, or availability of such environment/secondary devices, capabilities of such environment/secondary devices, locations of such environment/secondary devices, operational limits or constraints associated with such environment/secondary devices, operating schedules of such environment/secondary devices, historical usage/operations/configurations of such environment/secondary devices, power requirements of such environment/secondary devices, bandwidth associated with such environment/secondary devices, and/or the like. In some embodiments, the interactive media service platform 211 may include, in a media control package, control instructions (e.g., all control instructions) and/or secondary content (e.g., all secondary content) that are defined for a primary content item, but the network server device 204 may determine or decide which control instructions are to be executed and/or which secondary content is to be presented based on the premises profile.

For instance, in a case where a media control package includes a first instruction to cause a lighting controller or device to flash a light during a first scene of a movie, and a second instruction to cause a climate controller to adjust a temperature of an HVAC unit during a second scene of the movie, and where the network server device 204 determines, e.g., based on the above-mentioned premises profile or device information, that a user's premises includes a climate controller and/or an associated HVAC unit, but does not include a lighting controller and/or an associated lighting device, the network server device 204 may selectively apply the second instruction during the second scene, and may not apply the first instruction during the first scene.

As another example, in a case where a media control package includes, for a particular timestamp of a primary content item, an instruction to adjust a temperature setting of an HVAC unit, and where the network server device 204 determines, e.g., based on the above-mentioned premises profile or device information, that the HVAC unit was adjusted (e.g., manually or based on a schedule) to a current temperature within a threshold time before the particular timestamp is reached during playback of primary content item, the network server device 204 may determine not to apply the instruction during presentation of the primary content item.

As yet another example, in a case where a media control package includes a first instruction to cause a light to flash during a first scene of a movie, and a second instruction to lower a temperature setting of an HVAC unit during a second scene of a movie, where the network server device 204 determines, e.g., based on the above-mentioned premises profile or device information, that a first set of smart lighting devices is located in or near an area where the primary display device 208*p* is located (e.g., within a threshold distance from the primary display device 208*p*), that other smart lighting devices are located elsewhere in the premises, that a first smart HVAC unit is located in or near the area where the primary display device 208*p* is located (e.g., within the threshold distance from the primary display device 208*p*), and that other smart HVAC units are located elsewhere in the premises, the network server device 204 may cause a lighting controller 206*h* to flash the first set of lighting devices (and not the other lighting devices), and may cause a climate controller 206a to lower the temperature setting of the first HVAC unit (and not of the other HVAC units).

As a further example, in a case where a media control package includes an instruction to flash a light at a particular level of intensity during a particular scene of a movie, and where the network server device 204 determines, e.g., based on the above-mentioned premises profile or device information, that a first lighting device is located proximate to an area in which the primary display device 208p is located (e.g., within a threshold distance from the primary display device 208p) and that other lighting devices are located away from the area in which the primary display device 208p is located (e.g., beyond the threshold distance from the primary display device 208p), the network server device 204 may cause a lighting controller 206h to flash the first lighting device (e.g., to provide closer lighting effects) if the particular level of intensity satisfies a threshold (e.g., exceeds a particular threshold or the like) or to flash one or more of the other lighting devices (e.g., to provide more distant lighting effects) if the particular level of intensity does not satisfy the threshold (e.g., is less than or equal to the particular threshold or the like).

As yet a further example, in a case where a media control package includes an instruction to output certain sounds to augment a particular scene in a movie, such as a scary scene or the like, and where the network server device 204 determines, e.g., based on the above-mentioned premises profile or device information, that audio output devices, such as speakers 206s, are distributed throughout the premises, the network server device 204 may cause various ones of the speakers 206s (and not only speaker(s) 206s that are located within a threshold distance from the primary display device 208p) to output various portions of the sounds so as to provide a scary atmosphere throughout the premises during presentation the scary scene.

In various embodiments, the network server device 204 may dynamically update the premises profile or device information based on changes to device presence or availability, device capabilities, device location, operational limits or constraints, operating schedules, historical device usage/operations/configurations, device power requirements, device bandwidth, and/or the like. In some embodiments, the interactive media service platform 211 may obtain, or otherwise receive, the premises profile. Alternatively, the interactive media service platform 211 may obtain, or otherwise receive, device information from the network server device 204, and may independently build and maintain a premises profile for the premises based on the device information. In various embodiments, the interactive media service platform 211 may use a premises profile to identify environment/secondary device availability and to determine suitable control instructions and/or secondary content to include in a media control package for any given primary content item to be presented at the premises. In this way, the interactive media service platform 211 may generate customized media control packages for primary content items to be presented at different premises.

In various embodiments, the network server device 204 may account for known operational delays associated with an environment controller/device 206, a user device 202, or a secondary display device 208s, and control execution/presentation of instruction(s)/secondary content included in a media control package based on such delays. For example, in a case where a media control package includes an instruction to manipulate a particular environment controller/device 206 at a timestamp $t_x$ of a primary content item, and where the network server device 204 determines (e.g., based on the above-described premises profile or device information or the like) that the particular environment controller/device 206 has a certain operational delay (e.g., an average response delay of 500 milliseconds (ms) or the like), the network server device 204 may offset an execution time of the instruction by the certain operational delay (e.g., by causing the particular environment controller/device 206 to become manipulated at a time $t_x-500$ ms or the like) during presentation of the primary content item.

In various embodiments, the interactive media service platform 211 and/or the network server device 204 may monitor for changes to environment controllers/devices 206, user devices 202, and/or secondary display devices 208s during presentation of primary content, and may dynamically select and/or adjust, based on the monitoring, one or more control instructions to be executed and/or one or more secondary content items to be presented during the presentation of the primary content. For instance, in a case where the network server device 204 detects a presence of one or more user devices 202 that were not previously present at the start of presentation of the primary content, the network server device 204 may determine to provide the one or more secondary content items (e.g., such as that described above with respect to reference number 251 of FIG. 2F) to the one or more newly-detected user devices 202. In this way, the network server device 204 may adjust augmentation of media content presentations in real-time (or near real-time) as the status, presence, and/or arrangement of environment controllers/devices 206, user devices 202, and/or secondary display devices 208s fluctuates.

In various embodiments, the interactive media service platform 211 may generate media control packages, and/or the network server device 204 may adapt instructions/secondary content included in media control packages, based on user preferences and/or user profile information. User preferences/profile information may include, for example, interests of a user, a browsing history of the user, a media consumption history of the user, a purchase history of the user, an advertising response history of the user (e.g., advertisement exposures, click-through actions, affinities between users and advertisements and/or advertisement types), historical immersion-related behavior of the user, and/or other data representative or indicative of user activities, preferences, and/or behaviors (e.g., Interactive Advertising Bureau (IAB)-related data, tag data, genre data, embedding data, and/or the like). For instance, in a case where a light is to be flashed during presentation of primary content, such as a sport game, and it is determined that the user has a favorite color, prefers a certain sports team playing in the game, or the like, the interactive media service platform 211 may generate a media control package to include a customized lighting control instruction, and/or the network server device 204 may adapt a generic lighting control instruction included in a media control package, to flash a light in the particular color or, alternatively, to flash light having that particular color.

In some embodiments, the interactive media service platform 211 may identify (e.g., based on user profile information or the like) promotions or marketing offers (e.g., for popcorn, for a dress worn by a character in a film, etc.), and include such promotions/offers in a media control package to be presented (e.g., by secondary display device(s) 208s and/or the user devices 202) prior to presentation of primary content, at various points during presentation of the primary content, and/or after presentation of the primary content.

In one or more embodiments, the interactive media service platform 211 may generate media control packages, and/or the network server device 204 may adapt instructions/secondary content included in media control packages, based on social media information associated with a user. For example, in a case where a particular background tune is to be output at a certain point during presentation of primary content, the network server device 204 may substitute the particular background tune with a song that the user was determined to have recently indicated a preference for (e.g., "liked") on social media.

In various embodiments, the interactive media service platform 211 may require a user to provide authentication credentials (e.g., a password, biometric information, or the like) in order to access and/or configure the interactive media service. In some embodiments, the interactive media service platform 211 may provide a counterpart interactive media service application (or app) for installation and execution on a user device 202 and via which a user may access and/or configure operations of the interactive media service platform. In certain embodiments, the interactive media service app may include one or more user interfaces that enable a user to identify or select environment controllers/devices 206, secondary display device(s) 208s, and/or user device(s) 202 that are available in, near, or outside of the user's premises and/or that are permitted to be used for purposes of providing enhanced immersive experiences for the user during presentation of primary content. The interactive media service platform 211 may generate, for such primary content and according to timestamp(s) thereof, the media control package with control instructions and/or secondary content for the appropriate environment/secondary devices based upon the user's selections. For instance, in a case where multiple lighting devices are distributed throughout a user's premises, where manipulation of particular lighting devices (e.g., those located in the den) is acceptable to the user, but where manipulation of other lighting devices (e.g., those located in the kitchen or the bathroom) is not, the user may identify permissibility for the particular lighting devices and/or restrictions for the other lighting devices. It is to be appreciated and understood that numerous examples/possibilities abound with respect to user preferences relating to augmentation of media content consumption experiences. For example, a user may define limits or restrictions on manipulation of environment/secondary devices, such as where certain environment/secondary devices may be manipulated only a particular number of times a day, where certain environment/secondary devices may be manipulated only a particular number of times per presentation of a primary content item, where certain environment/secondary devices may be manipulated only when the controllers/device are not being operated in accordance with a schedule, and so on. In cases where the user does not define any restrictions as to permissibility of manipulation of environment/secondary devices, and assuming that the user's premises is equipped with operational environment/secondary devices that match control instruction(s) and/or secondary content in a media control package, the user may consume a full, immersive version of a primary content item.

In various embodiments, the interactive media service platform 211 and/or the network server device 204 may facilitate providing of secondary content to a user based upon identifying the user prior to, or during, presentation of primary content. For example, the user 1 may, using user device 202a, log onto the interactive media service platform 211 (e.g., via the interactive media service app) and/or the network server device 204 prior to, or during, playback of a primary content item, which may indicate to the interactive media service platform 211 and/or the network server device 204 that the user device 202a is available to receive and output secondary content. In some embodiments, a user may opt-in or define permission(s) for receiving secondary content on a user device 202, and/or may set preferences for types of secondary content (e.g., text, audio, images, video, etc.) that may be delivered to the user device 202 for output. Continuing the foregoing example, other users (e.g., user 2, user 3, and/or user 4) may similarly identify themselves and enable their respective user devices 202 (e.g., user device 202b, user device 202c, and/or user device 202d) to receive and output secondary content.

In various embodiments, the interactive media service platform 211 and/or the network server device 204 may employ one or more machine learning algorithms that are configured to learn a user's preferences for augmenting media content presentations. For example, in some embodiments, the interactive media service platform 211 and/or the network server device 204 may provide information regarding a user's preferences as input to one or more machine learning algorithms, which may perform machine learning to automate future determinations or predictions of augmentations of media content presentations. For example, the interactive media service platform 211 and/or the network server device 204 may train a machine learning algorithm to adjust future augmentations of media content presentations (e.g., generation of media control packages, selection of certain control instructions to be executed and/or secondary content to be presented, and/or the like) based on detections of the user's reactions to augmentations (e.g., based on detecting user feedback or instructions that certain environment controllers/devices (e.g., the climate controller 206a, the lighting controller 206h, etc.) should not be manipulated at all, that certain environment controllers/devices should not be manipulated beyond certain limits (e.g., the temperature setting should not be adjusted above/below a certain threshold, etc.), that certain environment controllers/devices are permitted to be manipulated only for certain types of primary content, and so on). In this way, the interactive media service platform 211 and/or the network server device 204 can predict acceptable media content augmentations based on machine learning algorithm(s), which improves the accuracy of the predictions, and conserves processor and/or storage resources that may otherwise be used to generate and store rules for predicting acceptable media content augmentations.

In some embodiments, the system 200 may not include the network server device 204. In such embodiments, one or more of the user device(s) 202 may perform some or all of the above-described functions of the network server device 204, such as communicating with the interactive media service platform 211 (or with the media server 210) to facilitate delivery of primary content and/or media control packages, controlling the environment controllers/devices 206 based on instructions included in media control packages, controlling presentation of primary content on the primary display device 208p, controlling presentation of secondary content on the secondary display device(s) 208s and/or the user devices 202, and so on. In certain embodiments, the interactive media service platform 211 may provide (e.g., for each premises or household) a virtual network server or the like that is capable of providing some or all of the various functions of the network server device 204 described above. A virtual network server may be an instance of a network that is assigned, or associated with, a particular premises, and dedicated to facilitate providing of interactive media services for the particular premises.

For simplicity of description, embodiments of the system 200 are described herein as relating to video content, such as video streaming. However, it is to be appreciated that various embodiments of the system 200 may be capable of leveraging devices in an environment to augment presentation of other types of media content, such as audio content, gaming content, Internet-related content, XR content, etc.

It is to be appreciated and understood that the quantity and arrangement of environment controllers/devices, primary display devices, secondary display devices, user devices, media servers, interactive media service platforms, and/or networks shown in or described with respect to FIGS. 2A-2G are provided as examples. In practice, there may be additional environment controllers/devices, primary display devices, secondary display devices, user devices, media servers, interactive media service platforms, and/or networks, or differently arranged environment controllers/devices, primary display devices, secondary display devices, user devices, media servers, interactive media service platforms, and/or networks than those shown in or described with respect to FIGS. 2A-2G. For example, the system 200 can include more or fewer environment controllers/devices, primary display devices, secondary display devices, user devices, media servers, interactive media service platforms, and/or networks, etc. Furthermore, two or more environment controllers/devices, primary display devices, secondary display devices, user devices, media servers, interactive media service platforms, and/or networks shown in or described with respect to one or more of FIGS. 2A-2G may be implemented within a single environment controller/device, primary display device, secondary display device, user device, media server, interactive media service platform, and/or network, or a single environment controller/device, primary display device, secondary display device, user device, media server, interactive media service platform, and/or network shown in or described with respect to one or more of FIGS. 2A-2G may be implemented as multiple, distributed environment controllers/devices, primary display devices, secondary display devices, user devices, media servers, interactive media service platforms, and/or networks. Additionally, or alternatively, a set of environment controllers/devices, primary display devices, secondary display devices, user devices, media servers, interactive media service platforms, and/or networks (e.g., one or more environment controllers/devices, primary display devices, secondary display devices, user devices, media servers, interactive media service platforms, and/or networks) of the system 200 may perform one or more functions described as being performed by another set of environment controllers/devices, primary display devices, secondary display devices, user devices, media servers, interactive media service platforms, and/or networks of the system 200.

Figure 2H:
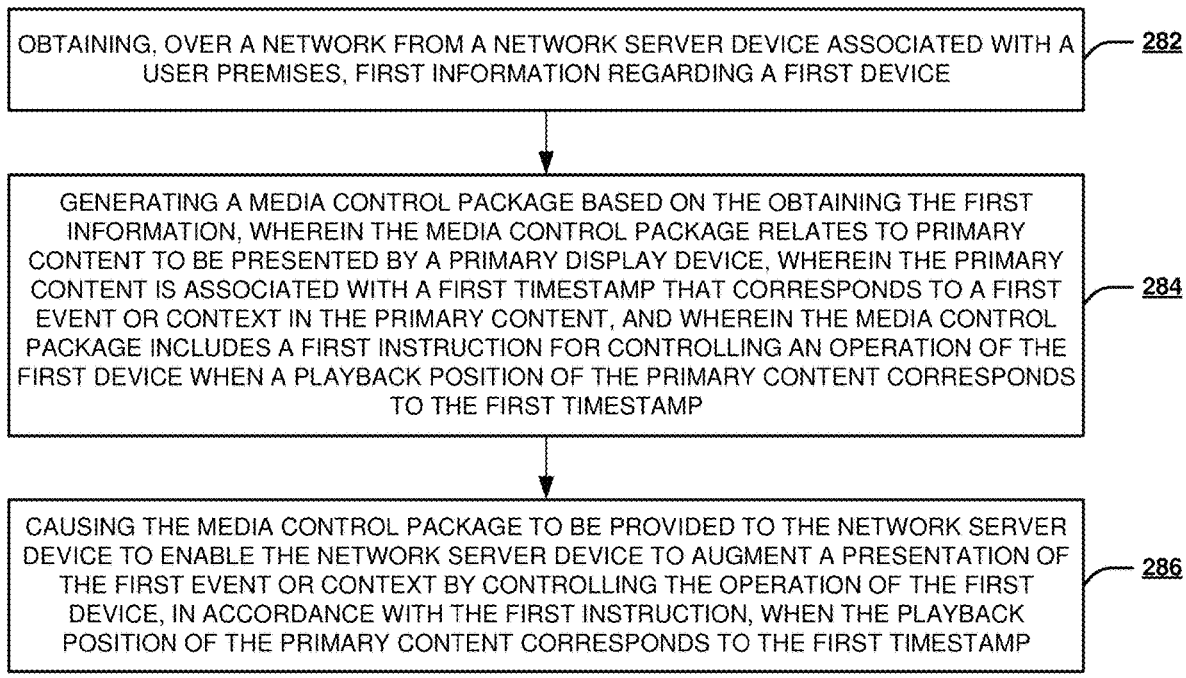
FIG. 2H depicts an illustrative embodiment of a method in accordance with various aspects described herein.

FIG. 2H depicts an illustrative embodiment of a method 280 in accordance with various aspects described herein. In some embodiments, one or more process blocks of FIG. 2H can be performed by an interactive media service platform, such as the interactive media service platform 211. In some embodiments, one or more process blocks of FIG. 2H may be performed by another device or a group of devices separate from or including the interactive media service platform, such as a user device 202, a network server device 204, an environment controller/device 206, a primary display device 208p, a secondary display device 208s, a media server 210, and/or a network 212.

At 282, the method can include obtaining, over a network from a network server device associated with a user premises, first information regarding a first device. For example, the interactive media service platform can obtain, over a network from a network server device associated with a user premises, first information regarding a first device in a manner similar to that described above with respect to the system 200 of FIG. 2A.

At 284, the method can include generating a media control package based on the obtaining the first information, wherein the media control package relates to primary content to be presented by a primary display device, wherein the primary content is associated with a first timestamp that corresponds to a first event or context in the primary content, and wherein the media control package includes a first instruction for controlling an operation of the first device when a playback position of the primary content corresponds to the first timestamp. For example, the interactive media service platform can generate a media control package based on the obtaining the first information in a manner similar to that described above with respect to the system 200 of FIG. 2A, where the media control package relates to primary content to be presented by a primary display device, where the primary content is associated with a first timestamp that corresponds to a first event or context in the primary content, and where the media control package includes a first instruction for controlling an operation of the first device when a playback position of the primary content corresponds to the first timestamp.

At 286, the method can include causing the media control package to be provided to the network server device to enable the network server device to augment a presentation of the first event or context by controlling the operation of the first device, in accordance with the first instruction, when the playback position of the primary content corresponds to the first timestamp. For example, the interactive media service platform can cause the media control package to be provided to the network server device to enable the network server device to augment a presentation of the first event or context by controlling the operation of the first device, in accordance with the first instruction, when the playback position of the primary content corresponds to the first timestamp in a manner similar to that described above with respect to the system 200 of FIG. 2A.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2J:
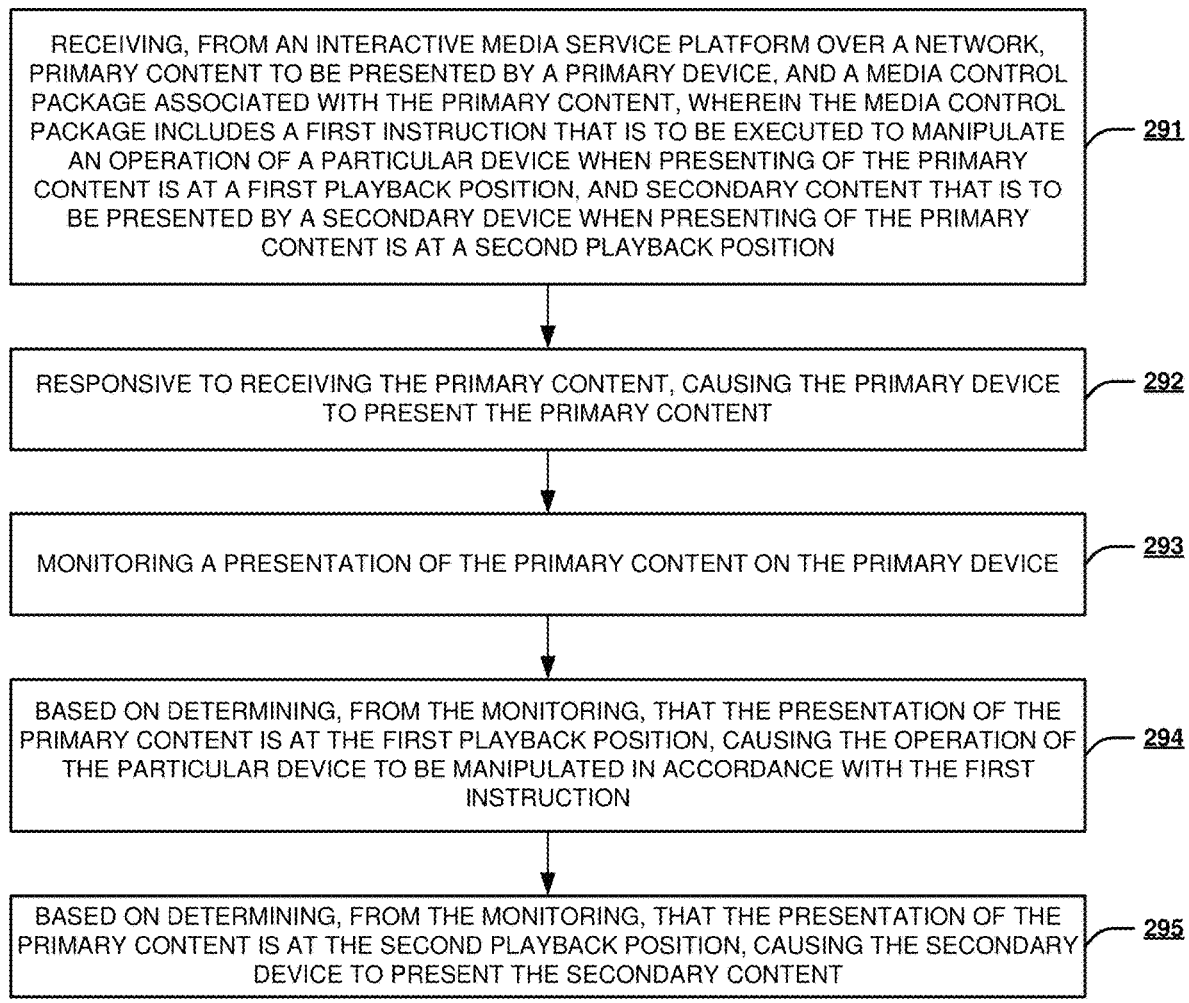
FIG. 2J depicts an illustrative embodiment of a method in accordance with various aspects described herein.

FIG. 2J depicts an illustrative embodiment of a method 290 in accordance with various aspects described herein. In some embodiments, one or more process blocks of FIG. 2J can be performed by a network server device, such as the network server device 204. In some embodiments, one or more process blocks of FIG. 2J may be performed by another device or a group of devices separate from or including the network server device, such as a user device 202, an environment controller/device 206, a primary display device 208p, a secondary display device 208s, a media server 210, a interactive media service platform 211, and/or a network 212.

At 291, the method can include receiving, from an interactive media service platform over a network, primary content to be presented by a primary device, and a media control package associated with the primary content, wherein the media control package includes a first instruction that is to be executed to manipulate an operation of a particular device when presenting of the primary content is at a first playback position, and secondary content that is to be presented by a secondary device when presenting of the primary content is at a second playback position. For example, the network server device can receive, from an interactive media service platform over a network, primary content to be presented by a primary device, and a media control package associated with the primary content in a manner similar to that described above with respect to the system 200 of FIG. 2A, where the media control package includes a first instruction that is to be executed to manipulate an operation of a particular device when presenting of the primary content is at a first playback position, and secondary content that is to be presented by a secondary device when presenting of the primary content is at a second playback position.

At 292, the method can include, responsive to receiving the primary content, causing the primary device to present the primary content. For example, the network server device can, responsive to receiving the primary content, cause the primary device to present the primary content in a manner similar to that described above with respect to the system 200 of FIG. 2A.

At 293, the method can include monitoring a presentation of the primary content on the primary device. For example, the network server device can monitor a presentation of the primary content on the primary device in a manner similar to that described above with respect to the system 200 of FIG. 2A.

At 294, the method can include, based on determining, from the monitoring, that the presentation of the primary content is at the first playback position, causing the operation of the particular device to be manipulated in accordance with the first instruction. For example, the network server device can, based on determining, from the monitoring, that the presentation of the primary content is at the first playback position, cause the operation of the particular device to be manipulated in accordance with the first instruction in a manner similar to that described above with respect to the system 200 of FIG. 2A.

At 295, the method can include, based on determining, from the monitoring, that the presentation of the primary content is at the second playback position, causing the secondary device to present the secondary content. For example, the network server device can, based on determining, from the monitoring, that the presentation of the primary content is at the second playback position, cause the secondary device to present the secondary content in a manner similar to that described above with respect to the system 200 of FIG. 2A.

While for purposes of simplicity of explanation, the respective processes are shown and described as a series of blocks in FIG. 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
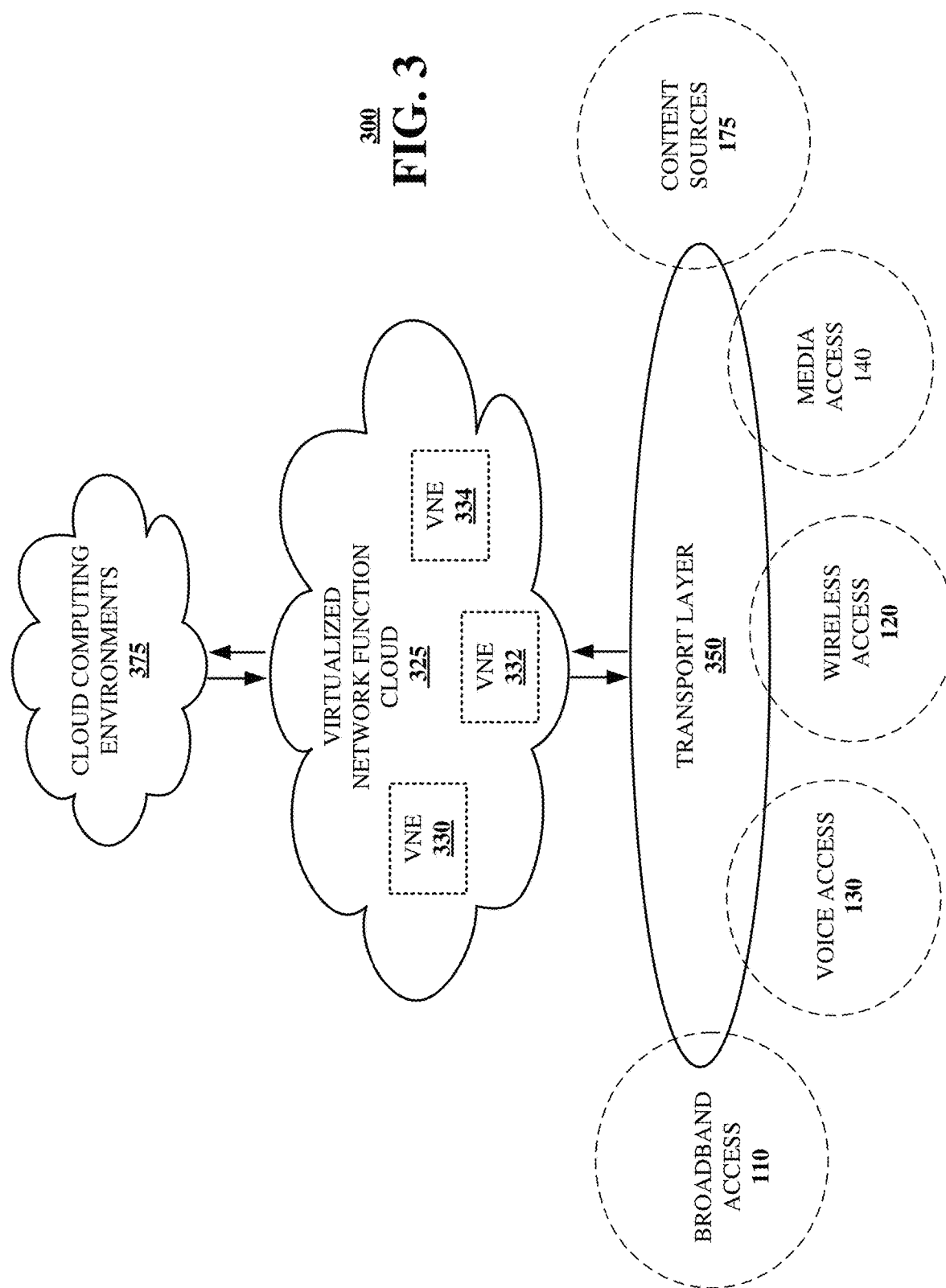
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and methods 280 and 290 presented in FIGS. 1, 2A-2H, and 2J. For example, virtualized communications network 300 can facilitate, in whole or in part, leveraging of devices in an environment to augment presentation of media content.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
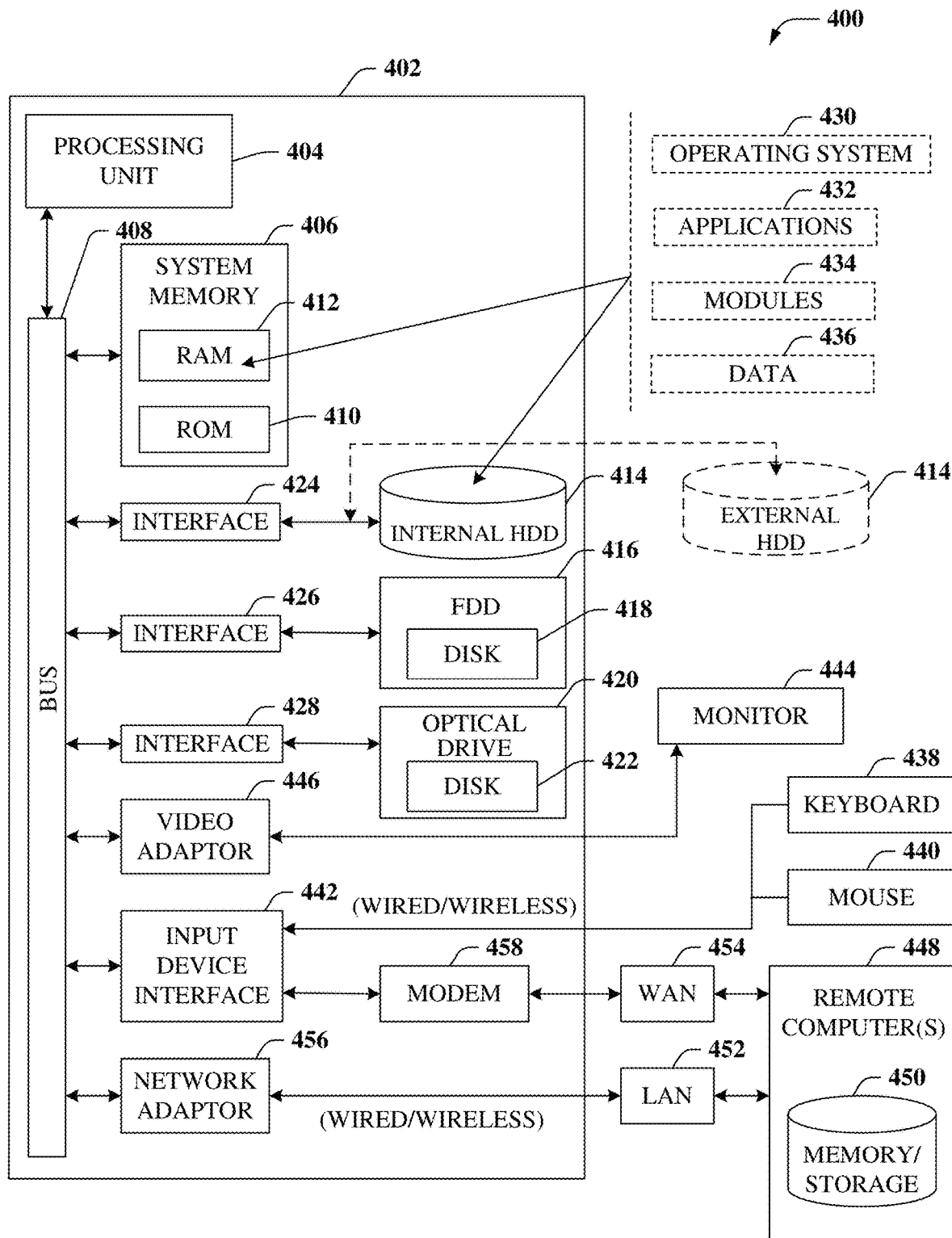
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, leveraging of devices in an environment to augment presentation of media content.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
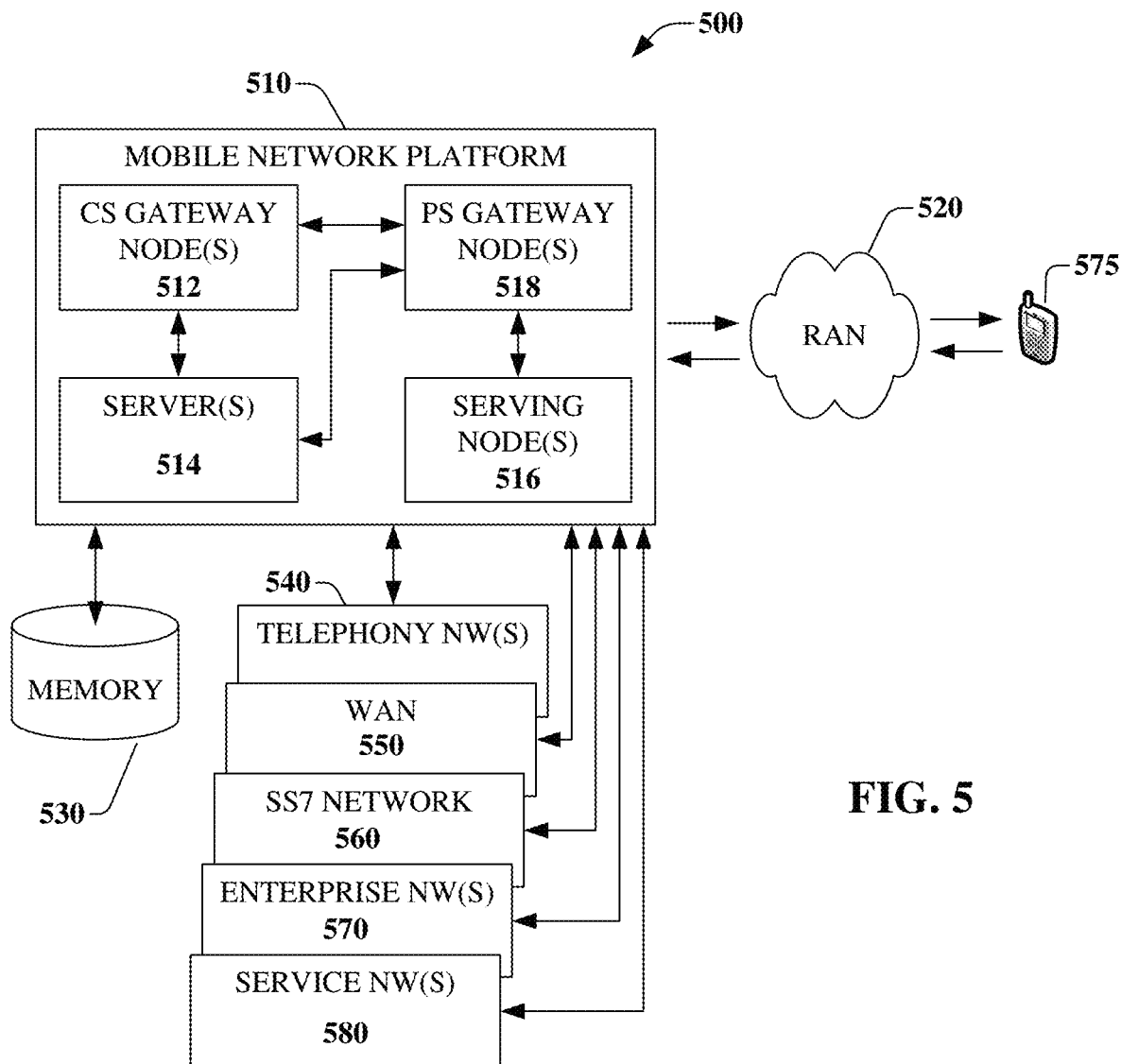
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, leveraging of devices in an environment to augment presentation of media content. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
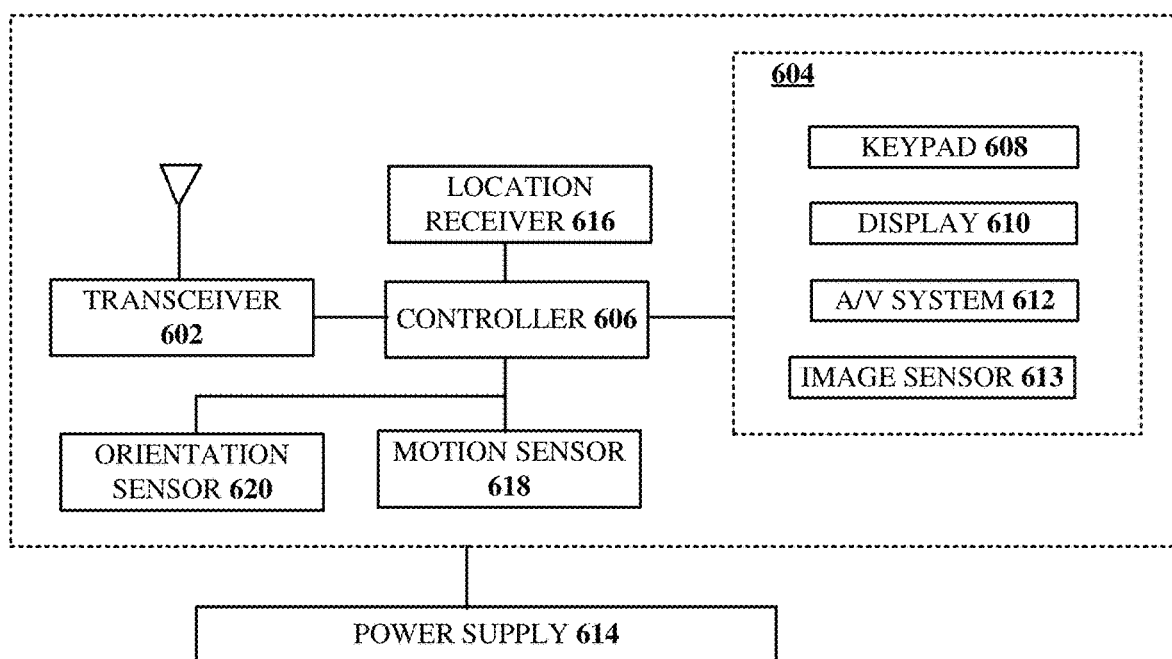
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, leveraging of devices in an environment to augment presentation of media content.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
monitoring a plurality of devices at a premises to detect a change in a characteristic associated with the plurality of devices at the premises;
dynamically modifying a premises profile associated with the plurality of devices at the premises according to the detecting the change in the characteristic associated with the plurality of devices at the premises to generate a modified premises profile;
generating a media control package based on first information associated with a first device of the plurality of devices at the premises of a first user and second information associated with a second device of the plurality of devices at the premises of a second user, according to the modified premises profile, wherein the media control package includes a first instruction for controlling operation of the first device when a playback position of primary content presented at a primary display device corresponds to a first timestamp, and wherein the media control package includes a second instruction for controlling operation of the second device when the playback position of the primary content presented at the primary display device corresponds to a second timestamp; and
causing the media control package to be provided to a network server device to enable the network server device to augment presentation of the primary content at the primary display device by controlling the operation of the first device when the playback position corresponds to the first timestamp, in accordance with the first instruction, to further cause an adjusting of a viewing environment for the primary content and by controlling the operation of the second device when the playback position corresponds to the second timestamp, in accordance with the second instruction.

2. The device of claim 1, wherein the operations further comprise obtaining, over the network from the network server device, the first information for controlling the operation of the first device and the second information for controlling the operation of the second device.

3. The device of claim 1, wherein the operation of the first device facilitates adjusting a climate characteristic of the viewing environment for the primary content.

4. The device of claim 1, wherein the operation of the second device facilitates adjusting a lighting characteristic of the viewing environment of the primary content.

5. The device of claim 1, wherein the first device comprises an intelligent Internet-of- Things (IoT) device.

6. The device of claim 5, wherein the intelligent IoT device comprises a lighting device controller, a climate device controller, an audio output device, or a combination thereof.

7. The device of claim 1, wherein the first information includes data regarding a status of the first device, an availability of the first device, a permission to use the first device for augmenting media content presentations, a location of the first device, an operational limit or constraint associated with the first device, an operating schedule of the first device, historical usage of the first device, power requirements of the first device, bandwidth of the first device, or any combination thereof.

8. The device of claim 1, wherein the primary content comprises video content, audio content, Internet-related content, gaming content, extended reality (XR) content, or any combination thereof.

9. The device of claim 1, wherein the primary content includes primary video content, wherein the first information is associated with a first character in the primary video content that is assigned to the first user, and wherein the second information is associated with a second character in the primary video content that is assigned to the second user.

10. The device of claim 1, wherein the first information includes secondary video content, secondary audio content, secondary text-based content, or a combination thereof that supplements the primary video content.

11. The device of claim 1, wherein the modified premises profile includes operational delay information associated with the first device of the plurality of devices, and wherein the network server device offsets an execution time associated with the first device according to the operational delay information.

12. A non-transitory machine-readable medium, comprising executable instructions that, when executed by a processing system of a residential gateway including a processor, facilitate performance of operations, the operations comprising:
receiving, over a network, primary content and a media control package associated with the primary content, wherein the media control package includes a first instruction that is to be executed to manipulate operation of a first device of a plurality of devices at a premises when presentation of the primary content at a primary display device is at a first playback position, wherein the media control package includes a second instruction that is to be executed to manipulate operation of a second device of the plurality of devices at the premises when the presentation of the primary content at the primary display device is at a second playback position, wherein the first instruction of the media control package is based, at least in part, on first information associated with the first device by a premises profile, wherein the second instruction of the media control package is based, at least in part, on second information associated with the second device by the premises profile, and wherein the premises profile is dynamically modified according to changes detected in a characteristic associated with the plurality of devices at the premises;

based on determining that the presentation of the primary content is at the first playback position, causing the operation of the first device to be manipulated in accordance with the first instruction to further cause a first adjusting of a viewing environment for the primary content; and based on determining that the presentation of the primary content is at the second playback position, causing the operation of the second device to be manipulated in accordance with the second instruction to further cause a second adjusting of the viewing environment for the primary content.

13. The non-transitory machine-readable medium of claim 12, wherein the first device comprises a lighting controller, a climate controller, an audio output device, or any combination thereof.

14. The non-transitory machine-readable medium of claim 12, wherein the operations further comprise receiving, over the network, secondary content that is to be presented by a secondary display device associated with a first user when presentation of the primary content at the primary display device is at a second playback position.

15. The non-transitory machine-readable medium of claim 12, wherein the causing the first device to be manipulated in accordance with the first instruction further comprises offsetting an execution time associated with the first device according to operational delay information according to the premises profile.

16. The non-transitory machine-readable medium of claim 12, wherein the secondary content comprises video content associated with an event or context in the primary content that corresponds to the second playback position, audio content associated with the event or context, text-based content associated with the event or context, or any combination thereof.

17. The non-transitory machine-readable medium of claim 12, wherein the operations further comprise:
  obtaining device information regarding the primary display device, the first device, and the secondary display device, and
  determining, based on the device information, that the first instruction is to be executed and that the secondary content is to be presented.

18. A method, comprising:
  monitoring, by a processing system including a processor, a plurality of devices at a premises to detect a change in a characteristic associated with the plurality of devices at the premises;
  dynamically modifying, by the processing system, a premises profile associated with the plurality of devices at the premises according to the detecting the change in the characteristic associated with the plurality of devices at the premises to generate a modified premises profile;
  deriving, by the processing system, a media control package based on first information associated with a first device of the plurality of devices at the premises of a first user and second information associated with a second device of the plurality of devices of the premises, according to the modified premises profile, wherein the media control package includes a first instruction for controlling operation of the first device when a playback position of primary content presented at a primary display device corresponds to a first timestamp, and wherein the media control package includes a second instruction for controlling operation of the second device when the playback position of the primary content presented at the primary display device corresponds to a second timestamp; and
  transmitting, by the processing system, the media control package to a network server device to enable the network server device to augment presentation of the primary content at the primary display device by controlling the operation of the first device, in accordance with the first instruction, to further cause an adjusting of a viewing environment for the primary content and by presenting second content at the second device, in accordance with the second instruction.

19. The method of claim 18, wherein the second device is associated with a second user.

20. The method of claim 18, further comprising accessing, by the processing system, the first information for controlling the operation of the first device and the second information for controlling the operation of the second device over the network from the network server device.

* * * * *